United States Patent [19]

Benoit et al.

[11] Patent Number: 4,706,206
[45] Date of Patent: Nov. 10, 1987

[54] COLOR PRINTING CONTROL USING HALFTONE CONTROL AREAS

[75] Inventors: Albert J. Benoit, Sandy Hook, Conn.; Dudley M. Boden, Cornwall-on-Hudson, N.Y.; David G. Decker, New Paltz, N.Y.; Stanley J. Kishner, Pomona, N.Y.; Robert D. Van Arsdell, Wappinger Falls, N.Y.

[73] Assignee: Kollmorgen Technologies Corporation, Dallas, Tex.

[21] Appl. No.: 643,243

[22] Filed: Aug. 24, 1984

Related U.S. Application Data

[63] Continuation-in-part of Ser. No. 533,925, Sep. 20, 1983, abandoned.

[51] Int. Cl.$^4$ ............................................... G01J 3/46
[52] U.S. Cl. .................................... 364/526; 364/551; 356/425
[58] Field of Search ................ 356/425; 364/526, 550, 364/551

[56] References Cited

U.S. PATENT DOCUMENTS

| | | | |
|---|---|---|---|
| 2,968,988 | 1/1961 | Crosfield | 356/425 |
| 3,054,561 | 9/1962 | Hazeltine | 364/526 |
| 3,555,262 | 1/1971 | Shimada | 364/526 |
| 3,756,725 | 9/1973 | Manring | 356/425 |
| 3,835,777 | 9/1974 | Krygeris | 101/350 |
| 4,003,660 | 1/1977 | Christie, Jr. et al. | 356/425 X |
| 4,200,932 | 4/1980 | Schramm et al. | 364/519 |
| 4,210,078 | 7/1980 | Greiner et al. | 101/136 |
| 4,310,248 | 1/1982 | Meredith | 356/425 X |
| 4,349,279 | 9/1982 | Jung | 364/526 X |
| 4,384,337 | 5/1983 | Mamberer et al. | 364/550 X |

Primary Examiner—Felix D. Gruber
Assistant Examiner—Joseph L. Dixon
Attorney, Agent, or Firm—Morgan & Finnegan

[57] ABSTRACT

In a multi-color printing process, measurements of the optical density of two different three-color halftone control areas are used to calculate dot gain and solid density of the cyan, magenta and yellow images. Since no single-color solid control targets are used, control targets may be hidden or camouflaged in a border or logo in the final printed product. The two control targets can consist of light and dark near-neutral gray balance targets. Alternatively, two different three-color halftone regions of the printed image can be used as control areas, eliminating the need for separate control targets. Densitometers having blue, green and red filters use the two three-color halftone control areas to provide density measurements which are used by a computer to calculate the densities of cyan, magenta, and yellow halftone images. The computer then calculates the dot gain and solid density of the process inks, which are displayed to a pressman who can make appropriate adjustments to the printing process.

18 Claims, 6 Drawing Figures

COLOR PRINTING CONTROL USING HALFTONE CONTROL AREAS

This application is a continuation-in-part of patent application Ser. No. 533,925, filed Sept. 20, 1983 now abandoned.

BACKGROUND OF THE INVENTION

This invention relates to a method for controlling multi-color printing processes, including lithography, gravure, letterpress and flexography, whereby predetermined areas on the printed material are measured by a densitometer, either manually, or automatically on the printing press. The results of these measurements are used to control various parameters on the printing press in order to maintain an acceptable level of quality in the printed colors.

Up to the present time, control of the printing process has been largely in the hands of the pressman. He and his crew have had to exercise a great deal of judgment in determining how to adjust printing press parameters in order to generate a final printed product that is acceptable to the customer. Acceptability is judged by visual assessment. The complexity of modern printing processes demands that the pressman have a high level of expertise and experience for exercising such judgments. The high operating speeds of modern printing presses, coupled with the high cost of ink and paper, put further pressure on the pressman to exercise control of the press in a timely fashion. If he is not successful, materials, time and effort are wasted as unacceptable product is printed. Typically, 20% of all ink and paper used for printing is wasted. Several percent of this is due to improper colors and is responsible for millions of dollars of waste per year.

Multicolor printing processes most often combine four inks, called process inks, in order to achieve the final printed product. These colors, usually cyan, magenta, yellow and black, are printed sequentially on the same area of the substrate, and interact to produce a wide gamut of colors. Most printed images are produced with halftone screens, yielding images that are arrays of small dots of varying sizes. Both the amount of ink present in the dots, and the dot sizes, are important in achieving the proper printed color.

The use of instrumentation in the printing process can provide timely, accurate control. It is more consistent and objective than visual judgment. While the acceptability of printed product is best judged visually, control of the process in order to maintain a given level of quality is best achieved through the use of instrumentation. A densitometer is an optical instrument used to measure the lightness or darkness of an image. Its numerical output, called optical density, is based on the logarithm of the optical reflectance of the image, and correlates well with visually perceived lightness or darkness. The logarithmic scale, however, is not necessary for the control of printing, and a reflectance measuring instrument based on linear scaling could be used for the same purpose. Designed as a quality control tool, the densitometer utilizes color filters or other means for isolating spectral regions that are complementary to the colors of the process inks in order to attain optimal sensitivity to changes in optical density. Instruments known as reflectometers or spectrophotometers, when used for the same purpose, are equivalent to a densitometer.

There are a number of U.S. Patents that describe configurations of densitometers to be used either on or in conjunction with a printing press, which suggest the use of measured densities for control of inking, either manually by the pressman, or automatically by means of a closed-loop control system. Patents describing densitometers that provide density readout to the press operator include U.S. Pat. No. 2,968,988, issued to Crosfield in 1961 and U.S. Pat. No. 4,210,078 issued to Greiner in 1980. Patents that suggest the use of density measurements for automatic inking control include U.S. Pat. No. 3,756,725, issued to Manring in 1973, U.S. Pat. No. 3,835,777, issued to Krygeris in 1974, U.S. Pat. No. 4,003,660, issued to Christie and Hunter in 1977, and U.S. Pat. No. 4,200,932, issued to Schramm, et al., in 1980. None of these patents describe the exclusive use of two different three-color halftone control targets for the instrumental control of multi-color printing.

In order to properly control the quality of printed colors, certain parameters of the process need to be measured. Visual assessment alone is not sufficiently reliable, since it is subjective, and varies from one press operator to another. Ideally, such measurements would be made within the printed image, whereby the density of certain key colors could be monitored. However, it is usually impractical to find an area suitable for measurement. In order to avoid this difficulty, control targets, often called color bars, are used. These are usually printed in a waste area of the sheet and contain a variety of targets for each color. Control targets consist of patches of solid and halftone printing, for each ink individually, as well as in combination with different inks. Provided that changes within the control targets are representative of those occurring within the image, measurements of the control targets can be used as an objective means of monitoring and controlling the color of the printing. Control targets are often disposed at various locations across the printed image, and so a densitometer needs to be positioned at these various locations in order to measure their optical densities. One or more densitometers can be sequentially positioned at these multiple locations, or mounted at fixed positions if a limited number of lateral positions across the width of the press need to be accessed.

The most important characteristics of the final print which require measurement and control in both single and multi-color work are tone reproduction (which implies control of dot size), and solid density. The parameters which are essential in this context are those which directly affect the amount of ink layed down on the substrate, and the dot area produced together with the relative magnitude of each of these parameters when more than one color is printed.

The amount of ink applied to the substrate can be monitored by measuring, with a densitometer, the optical density of a solid color bar. The measurement can be made automatically on the press, or manually off the press. Dot area is determined by first measuring the density of a halftone color bar and a nearby solid color bar and then calculating dot area via an equation such as the Yule-Nielsen equation, $$a = \frac{1-10-D_h/n}{1-10-D_s/n} = \frac{1-R_h^{1/n}}{1-R_s^{1/n}} \quad (1)$$

which is disclosed in Yule, J. A. C., and Nielsen, W. J. "The Penetration of Light into Paper and its Effect on Halftone Reproduction", TAGA Proceedings, 1951, pp. 65–76. In the Yule-Nielsen equation, $D_h$=halftone density, $D_s$=solid density, $R_h$=halftone reflectance, $R_s$=solid reflectance and n is a constant factor (the "Yule-Nielsen factor") that accounts for the light scattering or diffusion properties of the substrate. The dot area "a" has a value between 0 and 1. The Yule-Nielsen equation is solved separately for each of the three process colors, cyan, magenta and yellow. Cyan density is measured through a red filter, magenta density through a green filter and yellow density through a blue filter. The printed dot area is influenced by a multitude of printing parameters, including the pressure between the printing plate and the blanket cylinder, the thickness of the ink film the ink/water balance and various mechanical properties of the press. Increase in dot area, known as dot gain, must be continually monitored during a run, since excessive dot gain will influence the tone reproduction and color of the printed image. One of the most frequent decisions faces by a press operator arises when the measured density of a halftone color bar, for one of the process colors, increases during the printing run. He must decide whether the density increase is the result of a thicker film of ink, or dot gain. By measuring the density of a halftone color bar and a solid color bar, this question can be answered, and he can act to reduce the ink flow, or to reduce sources of dot gain.

The presence of color bars is not usually desired in the final printed product. Sometimes the color bars are printed in a region that will later be trimmed so that they can be used for control of printing, and then discarded. In some instances, the color bars can be hidden, as in the folds of a package, or in the binding of a magazine. When color bars cannot be trimmed or hidden, they are usually not printed. In such cases, the use of instrumentation for control is abandoned.

It appears, however, that certain color bars can be camouflaged, so that their presence is not objectionable. For example, one commonly used control target is used to measure gray balance. This type of color bar is disclosed in Elyjiw, Z. and Preucil, F., "The New GATF Color Reproduction Guide," GATF Research Progress No. 67. Gray balance is the ability of the three process color inks to be combined in the proper porportions to form a visual neutral or near-neutral color. The gray balance target is designed for visual judgment. A significant change in the hue indicates a change in inking or dot gain in one of the process inks. Gray balance targets can be camouflaged by integration into printed borders or logos.

In certain instances, gray balance control targets cannot be printed with enough accuracy to assure that they remain of consistent hue. Gray balance targets are extremely sensitive to changes in inking and dot gain, and while they would therefore be ideal for the control of some printing processes, they may be overly sensitive in other applications where a change in hue would be objectionable. As an alternative, three-color halftone images with desired hues could be used, and similarly hidden in borders or logos. Even selected regions of the printed image could be used, eliminating the need for the use of control targets.

SUMMARY OF THE INVENTION

The invention comprises a method of determining dot gain and solid density, based on the use of two different three color halftone control targets or image regions, or two different gray balance targets, and without the use of single-color solid or halftone color bars. These control targets or image regions can be referred to as "control areas". In the common case, when halftone and solid colors bars are printed in each of the process colors, solid density is found directly, and dot area is found via the Yule-Nielsen equation. The invention provides equations for determining yellow, magenta, and cyan dot gain and solid density, based on measurement of the optical density of two different three-color halftone control areas, rather than three solid targets and three halftone targets.

DETAILED DESCRIPTION OF THE INVENTION

Figure 1:
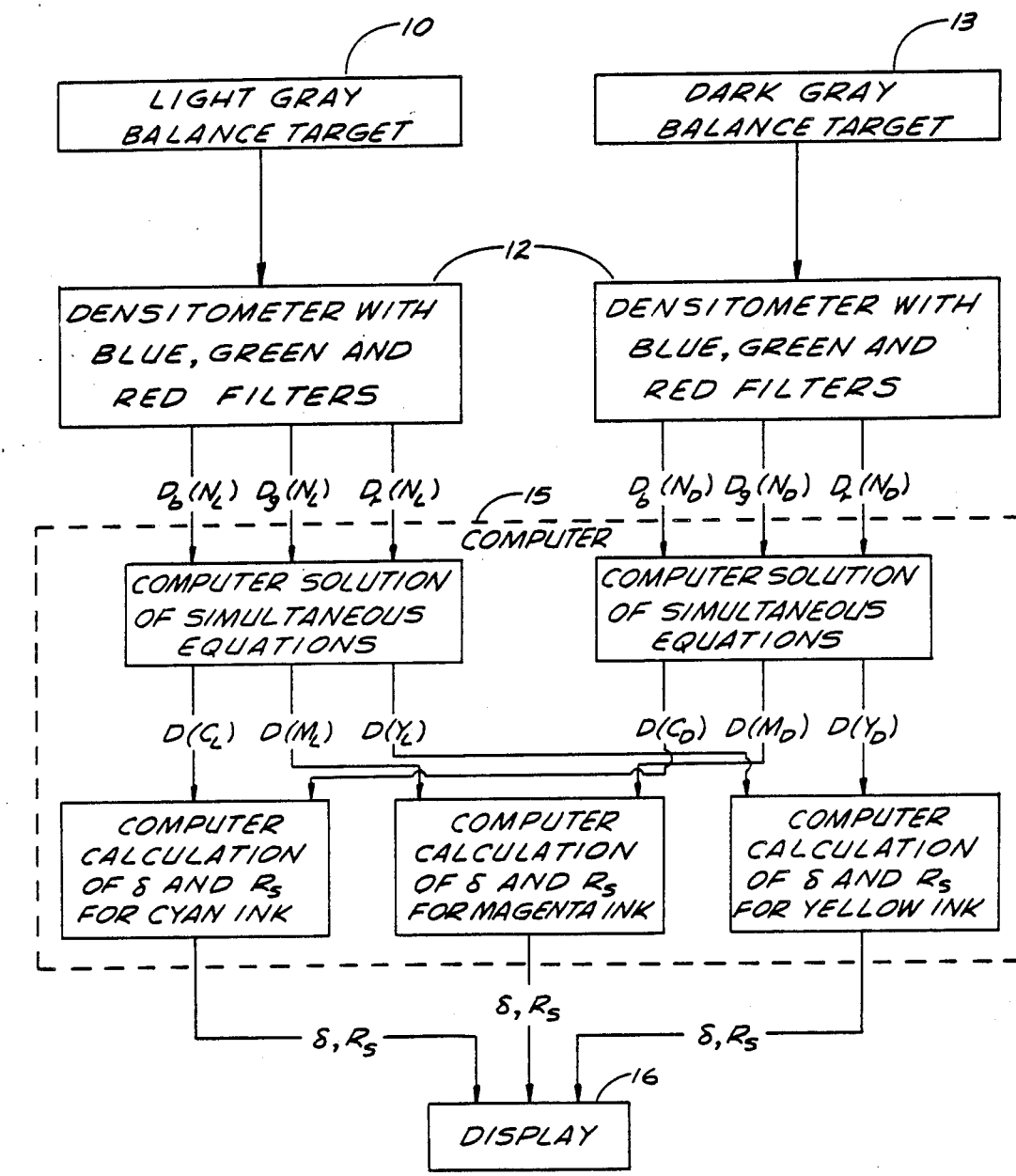
FIG. 1 shows a flow chart depicting the steps necessary to implement the invention using two gray balance targets.

The invention makes use of three-color halftone control targets or image regions in which the relative dot areas of the cyan, magenta, and yellow images are properly chosen to give the desired hues. The invention requires the use of two three-color halftone control targets or image regions, or two gray balance control targets. If image regions cannot be used, a border, design or logo can be configured out of the two control targets such that its presence is acceptable in the final printed publication. There are then two steps to the method:

1. Use red, green and blue density measurements of the two control targets or image regions to determine the densities of the individual halftone patterns of cyan, magenta, and yellow process inks, respectively that make up the two three-color halftone control targets or image regions.
2. For each process ink, calculate dot gain and "equivalent" solid density based on the densities of the two different halftone patterns.

The methods used in step #1 are not mathematically exact, but are based on approximations that have been empirically determined to be sufficient to make the method of practical use. The preferred method of step #2 is a mathematically exact solution, based on a theoretical model of dot gain. An alternate approximate method is hereinafter described.

In step #1, a mathematically correct analysis does exist for the special case of three overprinted solid colors. Each process color has a nonzero density as determined by measurement through each of the three colored filters; red, green and blue. It is necessary to account for each ink's contribution to the red density in order to determine the red density of the cyan ink.

Similarly, it is necessary to account for each ink's contribution to the green density in order to determine the green density of the magenta ink and to account for each ink's contribution to the blue density in order to determine the blue density of the yellow ink. It is assumed that there is 100% trapping (i.e., each ink prints on the other inks as it would print on paper) and the Beer-Lambert law is obeyed (i.e., the densities are additive). Under these assumptions, the following three equations can be written for the blue, green and red densities of the overprint;

$$D_b(N) = \left(\frac{D_b(C)}{D_r(C)}\right) D_r(C) + \left(\frac{D_b(M)}{D_g(M)}\right) D_g(M) + D_b(Y) \quad (2)$$

$$D_g(N) = \left(\frac{D_g(C)}{D_r(C)}\right) D_r(C) + D_g(M) + \left(\frac{D_g(Y)}{D_b(Y)}\right) D_b(Y) \quad (3)$$

$$D_r(N) = D_r(C) + \left(\frac{D_r(M)}{D_g(M)}\right) D_g(M) + \left(\frac{D_r(Y)}{D_b(Y)}\right) D_b(Y) \quad (4)$$

where
$D_b(N)$ = blue density of overprint
$D_g(N)$ = green density of overprint
$D_r(N)$ = red density or overprint
$D_b(C)$ = blue density of cyan
$D_g(C)$ = green density of cyan
$D_r(C)$ = red density of cyan
$D_b(M)$ = blue density of magenta
$D_g(M)$ = green density of magenta
$D_r(M)$ = red density of magenta
$D_b(Y)$ = blue density of yellow
$D_g(Y)$ = green density of yellow
$D_r(Y)$ = red density of yellow The bracketed ratios are constants that depend on the spectral shapes of the ink reflectivities. The equations can then be rewritten in the following form:

$$D_b(N) = a_{11} D(C) + a_{12} D(M) + a_{13} D(Y) \quad (5)$$

$$D_g(N) = a_{21} D(C) + a_{22} D(M) + a_{23} D(Y) \quad (6)$$

$$D_r(N) = a_{31} D(C) + a_{32} D(M) + a_{33} D(Y) \quad (7)$$

where $$a_{11} = \left(\frac{D_b(C)}{D_r(C)}\right) \quad a_{12} = \left(\frac{D_b(M)}{D_g(M)}\right) \quad a_{13} = 1$$

$$a_{21} = \left(\frac{D_g(C)}{D_r(C)}\right) \quad a_{22} = 1 \quad a_{23} = \left(\frac{D_g(Y)}{D_b(Y)}\right)$$

$$a_{31} = 1 \quad a_{32} = \left(\frac{D_r(M)}{D_g(M)}\right) \quad a_{33} = \left(\frac{D_r(Y)}{D_b(Y)}\right)$$

The subscripts on the D(C), D(M) and D(Y) terms have been dropped in equations (5), (6) and (7), since the normal complementary filters are specified (i.e., red for cyan ink, green for magenta ink and blue for yellow ink). Solution of these equations for D(C), D(M) and D(Y) in terms of the measured quantities $D_b(N)$, $D_g(N)$ and $D_r(N)$ can be achieved by normal matrix methods, by using Cramer's rule which is disclosed in R. Bronson, "Matrix Methods", Academic Press, 1970 (pp. 37–38). The solution is as follows:

$$D(C) = \begin{vmatrix} D_b(N) & a_{12} & a_{13} \\ D_g(N) & a_{22} & a_{23} \\ D_r(N) & a_{32} & a_{33} \end{vmatrix} / |A| \quad (8)$$

$$D(M) = \begin{vmatrix} a_{11} & D_b(N) & a_{13} \\ a_{21} & D_g(N) & a_{23} \\ a_{31} & D_r(N) & a_{33} \end{vmatrix} / |A| \quad (9)$$

$$D(Y) = \begin{vmatrix} a_{11} & a_{12} & D_b(N) \\ a_{21} & a_{22} & D_g(N) \\ a_{31} & a_{32} & D_r(N) \end{vmatrix} / |A| \quad (10)$$

where | | denotes the determinant, and A is the 3×3 determinant with elements $a_{ij}$.

The method outlined above, which is mathematically correct for solid overprints with 100% trapping, can be applied to the pair of three-color halftone control targets or image regions. The $a_{ij}$ coefficients in equations (5), (6) and (7), which are ratios of densities, are determined empirically by measuring the single color halftones that make up the three-color halftone control targets or image regions, with a densitometer. This is a calibration step that only need be done once with a given set of inks and corresponding substrate, and involves printing the separate color halftones that constitute the two different control targets or image regions. Although the assumption of additivity of densities is not strictly correct for overprinted halftones, the assumption of additivity has been found to be sufficiently accurate to be of practical use. Even the fact that the trapping is not ideal does not pose a problem if dot areas in the 75%–100% region are avoided. It is only in these larger dot area targets, where there is significant overlapping of printed dots, that poor trapping would have a significant effect on halftone overprints. It has been found that the $a_{ij}$ coefficients are dependent on dot area, so that separate calibrations are required for the two different control targets or image regions.

Another factor that influences the accuracy of this approximate technique is the set of densitometer filters used for measuring densities. It has been found that narrowband filters (i.e. with bandwidths ≦30 nm) provide density measurements that show a higher degree of additivity than can be achieved with the commonly used wideband filters (usually WRATTEN filters 47, 58 and 25). Furthermore, the use of complementary narrowband filters minimizes the influence of one ink on the density of another. Both of these characteristics enhance the accuracy of the technique when narrowband filters are used in the densitometer.

In step #2, it is assumed that step #1 is complete, and that given the blue, green and red densities of the first and second three-color halftone control targets or image regions, equivalent densities of the halftones for the cyan, magenta, and yellow inks have been calculated. Considering each process ink separately, then the densities of the first and second halftones, $D_1$ and $D_2$ are given. The method depends on a mathematical model that described dot gain as a function of dot area. One model that has shown good correlation with empirical measurements is the GRL model which is disclosed in J. A. S. Viggiano, "The GRL Dot Gain Model" TAGA Proceedings (1983). In the GRL model dot gain is given by:

$$G = 2\delta \sqrt{a(1-a)} \quad (11)$$

where $\delta$ = dot gain for 50% dot area, and $a$ = dot area. Then, with dot gain, the dot area becomes $$(a + G) = a + 2\delta \sqrt{a(1-a)}.$$

Note, that according to equation (11), dot gain is largest for 50% dot area.

If dot area is substituted into the Yule-Nielsen equation, for the two original (i.e., on the printing plate) dot areas $a_1$ = first target or image region and $a_2$ = second target or image region, the following equations result for each process color:

$$(1 - R_1^{1/n}) = [a_1 + 2\delta \sqrt{a_1(1-a_1)}] \times (1 - R_s^{1/n}) \quad (12)$$

$$(1 - R_2^{1/n}) = [a_2 + 2\delta \sqrt{a_2(1-a_2)}] \times (1 - R_s^{1/n}) \quad (13)$$

Where
$R_1$ = reflectance of first target or image region = $10^{-D_1}$
$R_2$ = reflectance of second target or image region = $10^{-D_2}$, and
$R_s$ = reflectance of solid = $10^{-D_s}$ Equations (12) and (13) use the reflectance form of the Yule-Nielsen equation since the solution for R is more conveniently obtained than the solution for D.

Equations (12) and (13) can be solved simultaneously for the two unknowns $\delta$ and $R_s$ for each process color, given by $$\delta = \quad (14)$$

$$\frac{a_2(1 - R_1^{1/n}) - a_1(1 - R_2^{1/n})}{2\sqrt{a_2(1-a_2)} \times (1 - R_1^{1/n}) - 2\sqrt{a_1(1-a_1)} \times (1 - R_2^{1/n})}$$

$$R_s = \left\{ 1 - \frac{(1 - R_1^{1/n})}{a_1 + 2\delta \sqrt{a_1(1-a_1)}} \right\}^n \quad (15)$$

Substitution of $\delta$ from equation (14) into equation (11) can be used to determine the amount of dot gain for the $a_1$ and $a_2$ dot areas, if desired. Thus, equations (14) and (15) provide the pressman with the information needed to take corrective action.

If the two three-color halftone targets or image regions are chosen to be identical, then there is no solution to simultaneous equations (12) and (13). Generally, the greater the difference in the densities of the two targets or image regions, the more accurate are the solutions for dot gain and solid density. If neutral gray balance control targets are used, then light and dark gray targets can be used. If a particular hue is chosen, then light and dark versions of that hue can be used. However, two different hues may also be used. What is important, however, is that the two three-color halftone control targets or image regions have different dot areas for each of the process colors.

An alternate method of achieveing step #2 proceeds as follows. From the Yule-Nielsen equation, we get the expression;

$$\frac{(1 - R_1^{1/n})}{(1 - R_2^{1/n})} = \frac{a_1 + G_1}{a_2 + G_2} \quad (16)$$

where $G_1$ and $G_2$ are dot gains for the first and second halftone patterns, respectively. The reflectances $R_1$ and $R_2$, measured through each of the three colored filters; red, green and blue, are computed from measured densities. The expression uses the reflectance form of the Yule-Nielsen equation since the solution for R is more conveniently obtained than the solution for D. The expression is independent of solid density. If the second halftone is chosen to have dot areas in the 50% range, the dot gain for the second target or image region $G_2$ increases faster than that for the first target or image region, $G_1$. This results in a decrease in the ratio $(a_1+G_1)/(a_2+G_2)$. Therefore, a calibration procedure, in which the expression in equation (16) is measured for various degrees of dot gain, will provide the parameters necessary to use the expression as a single numerical guide to the degree of dot gain present in the second target or image region. The method is empirical, but simple to use because of the lack of computational complexity. Once the dot gain of the second target or image region is found, the Yule Nielsen equation can be used to compute the reflectance of the solid $R_s$, for each process color, according the the expression:

$$R_s = \left( 1 - \frac{1 - R_2^{1/n}}{a_2 + G_2} \right)^n \quad (17)$$

Referring to FIG. 1, the present invention will be described when two different gray balance control targets are used. It can be seen that the light gray balance control target 10 is measured through the blue, green, and red filters of a densitometer 12. Likewise, the same three density readings are taken for the dark gray balance target 13 by densitometer 12. For each of these sets of three densities, a set of simultaneous equations is solved in a suitably programmed computer 15 for the densities of the cyan, magenta and yellow halftones that make up the gray balance target. These halftone densities are then analyzed in pairs, one light and one dark halftone for each process color, in order to find the dot gain for a 50% dot area target, and the equivalant solid reflectance. The reflectance is mathematically converted to density.

This information is then displayed to the pressman on a display 16 such as a CRT.

Figure 2:
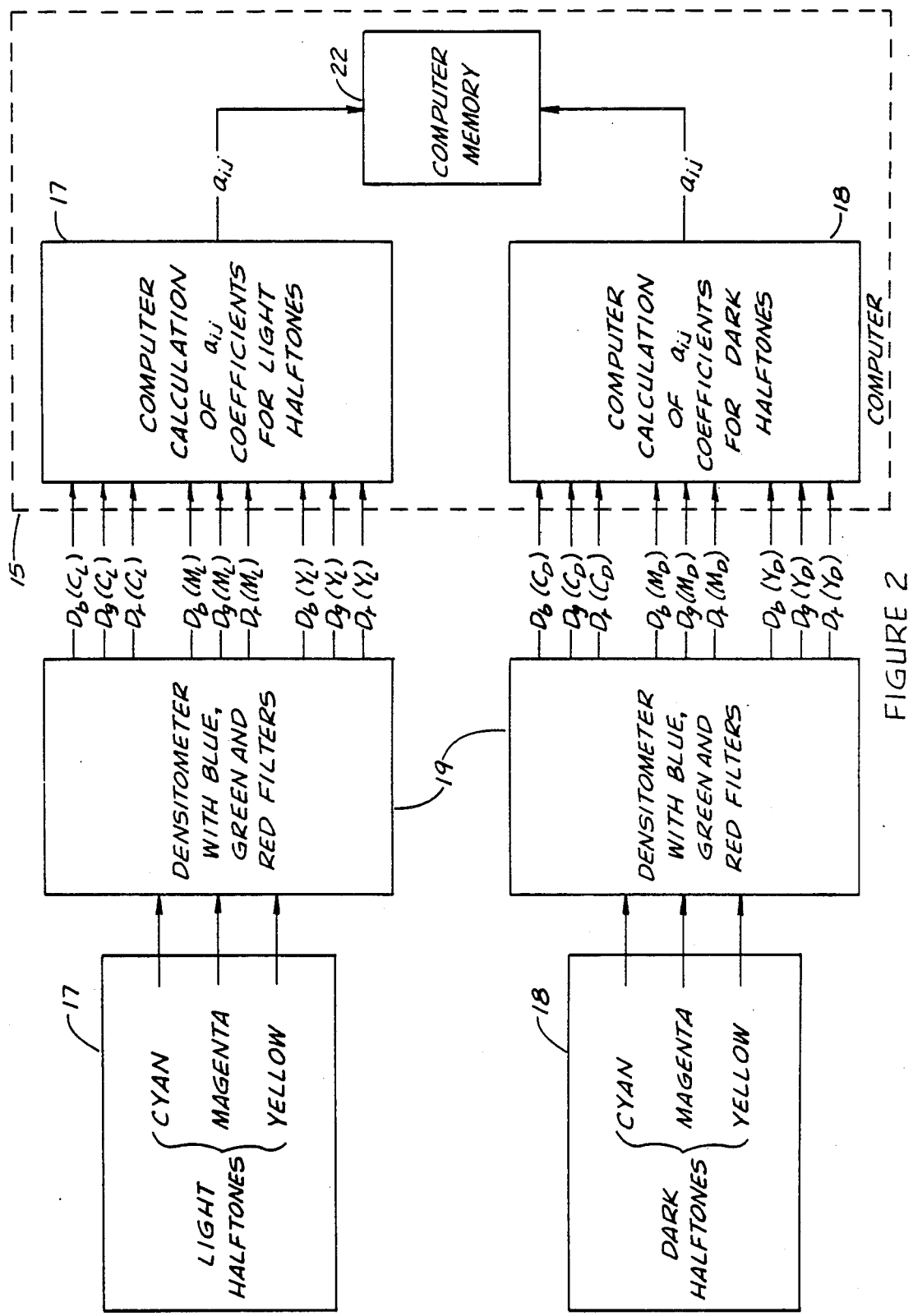
FIG. 2 shows a flow chart of the steps necessary for calibration of step #1 associated with FIG. 1.

Referring now to FIG. 2, the procedure is shown for calibration of step 1, in which the densities of the cyan, magenta and yellow halftones are calculated from measurements of the gray balance targets 10, 13. We need to print the constituent cyan, magenta and yellow halftones that are used for the gray balance targets 10, 13. The next step is to measure the blue, green and red densities of the two sets of three halftones 17, 18 with densitometer 19. The densities of the halftones 17, 18 are used to calculate the $a_{ij}$ coefficients, which are required for use in conjunction with the densities of the gray balance targets 10, 13 to calculate the densities of the individual constituent halftones, according to equations (8), (9) and (10) described above. The coefficients are calculated in computer 15 and stored in memory 22 for future use.

Figure 3:
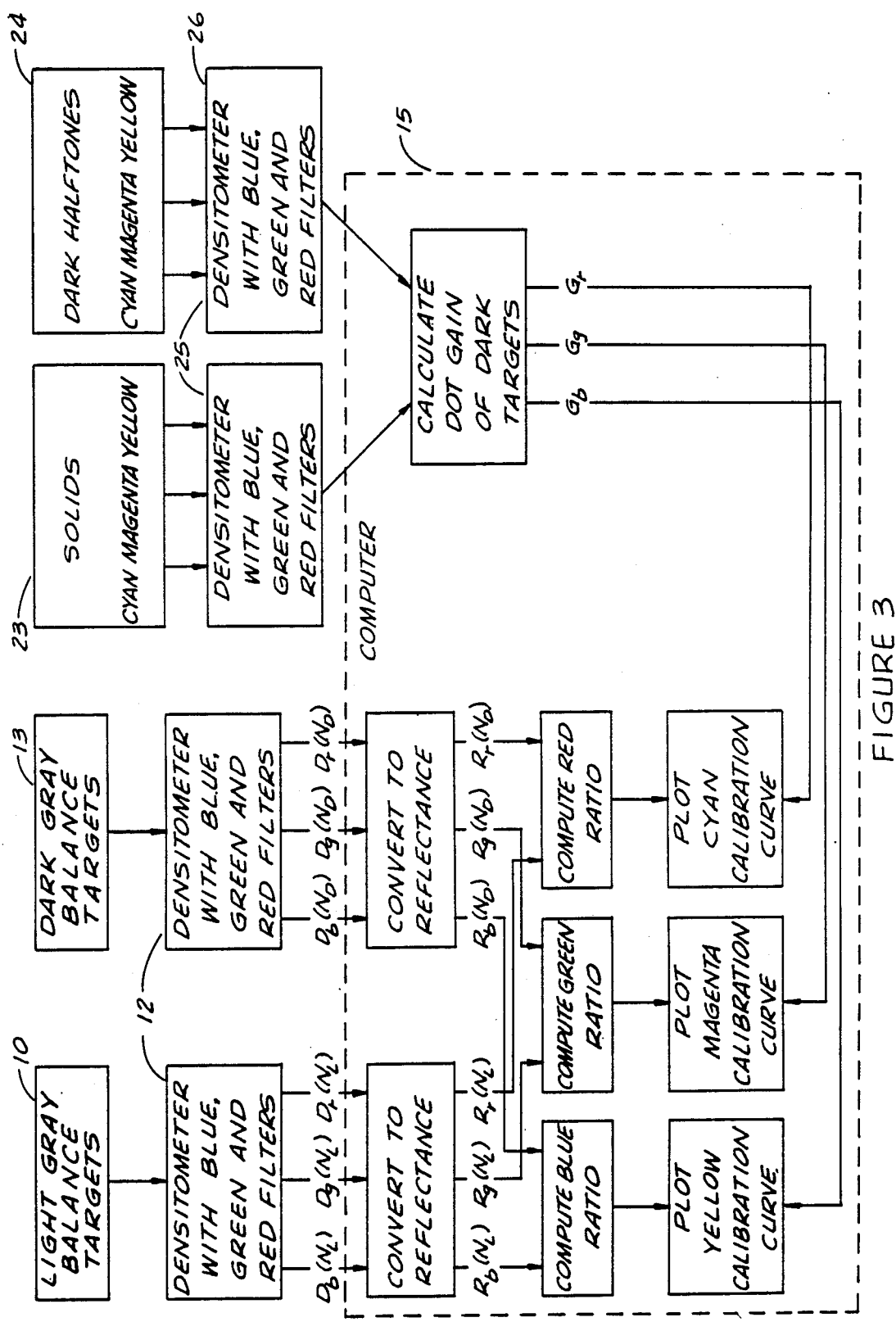
FIG. 3 shows a flow chart of the steps necessary for calibration of the alternate solution to step #2 associated with FIG. 1.

FIG. 3 shows a flow chart for the calibration required for the alternate empirical solution of step #2. The two gray balance targets 10, 13 along with three targets of the dark constituent halftones 24, as well as cyan, magenta and yellow solids 23 are printed. This group of eight targets 10, 13, 24, 23 (light gray balance, dark gray balance, dark cyan, magenta and yellow, and solid cyan, magenta and yellow) should be printed under a variety of press conditions in order to generate variations in dot gain that are representative of the variations that will be encountered under normal operation. For each printed image of these eight targets, 10, 13, 23, 24, the two gray balance targets 10, 13 should be measured with densitometer 12 for blue, green and red densities. The densities are converted in computer 15 to reflectances, and the expression in equation (16) is calculated in computer 15 separately for the blue, green and red channels. Then the dot gain of the dark halftones should be found by measuring the dark halftones and solids with densitometer 25 and using the Yule-Nielsen equation. Calibration then involves the plotting of a calibration curve of the expression in equation (16) as a function of dot gain, separately for the blue, green and red ratios. These curves are then used in the solution of step #2, whereby the expression derived from measurement of the light and dark halftones would correspond to a unique value of dot gain.

Figure 4:
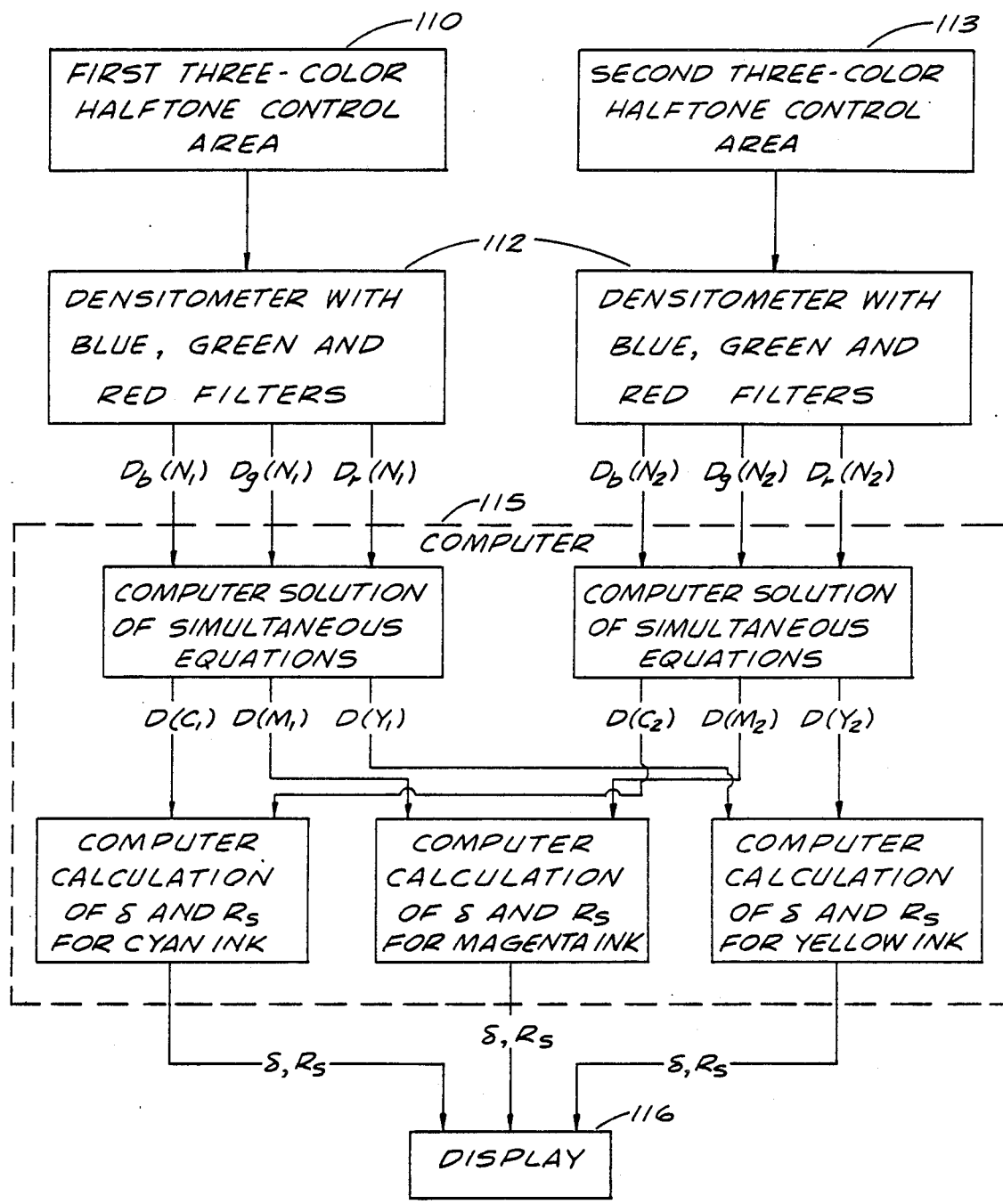
FIG. 4 shows a flow chart depicting the steps necessary to implement the invention using two different three color halftone control areas.

Referring to FIG. 4, the present invention will be described when two different three color halftone control areas are used. It can be seen that the first control area 110 is measured through the blue, green, and red filters of a densitometer 112. Likewise, the same three density readings are taken for the second control area 113 by densitometer 112. For each of these sets of three densities a set of simultaneous equations is solved in suitably programmed computer 115 for the densities of the cyan, magenta and yellow halftones that make up the three-color halftone control areas. These halftone densities are then analyzed in pairs, for each process color, in order to find the dot gain for a 50% dot area target, and the equivalent solid density. This information is then displayed to the pressman on a display 116 such as a CRT.

Figure 5:
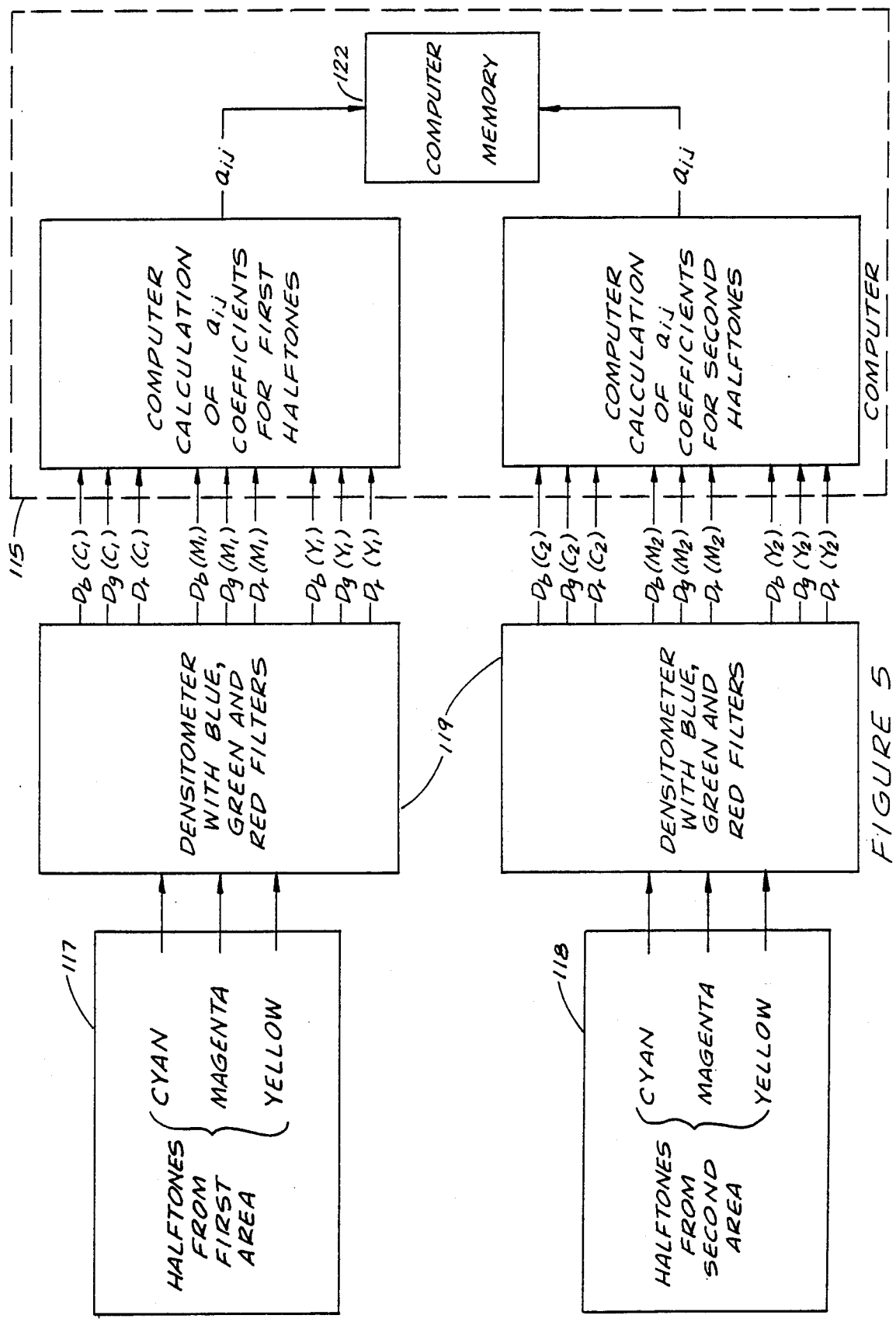
FIG. 5 shows a flow chart of the steps necessary for calibration of Step #1 associated with FIG. 4.

Referring now to FIG. 5, the procedure is shown for calibration of step 1, in which the densities of the cyan, magenta and yellow halftones are calculated from measurements of the three-color halftone control areas 110, 113. We need to print the constituent cyan, magenta and yellow halftones that are used for the control areas 110, 113. The next step is to measure the blue, green and red densities of the two sets of three halftones 117, 118 with densitometer 119. The densities of the halftones 117, 118 are used to calculate the $A_{ij}$ coefficients, which are required for use in conjunction with the densities of the control areas 110, 113 to calculate the densities of the individual constituent halftones, according to equations (8) (9), and (10) described above. The coefficients are calculated in computer 115 and stored in memory 122 for future use.

Figure 6:
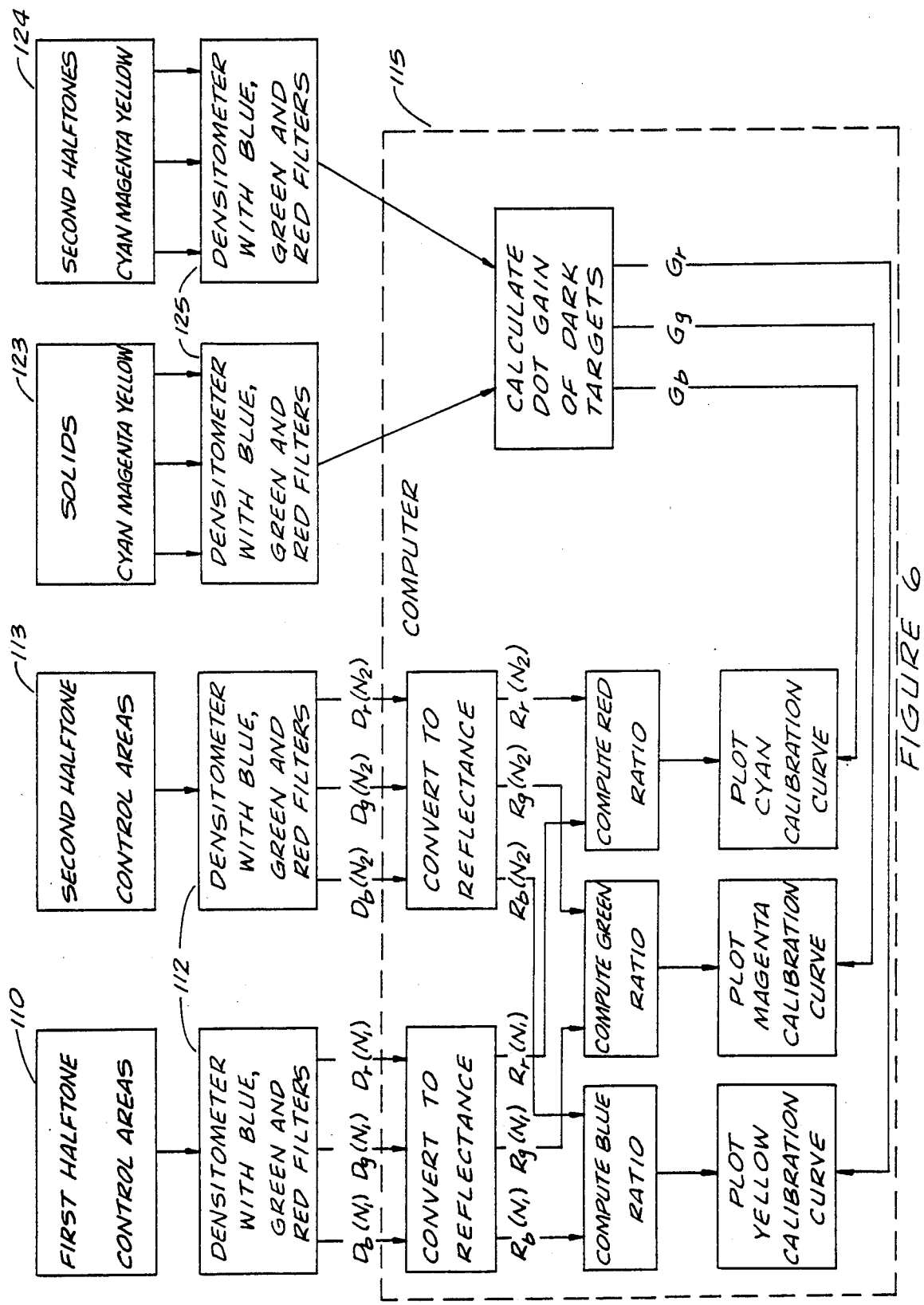
FIG. 6 shows a flow chart of the steps necessary for calibration of the alternate solution to set #2 associated with FIG. 4.

FIG. 6 shows a flow chart for the calibration required for the alternate empirical solution of step #2. The two control areas 110, 113, along with three targets of the second constituent halftones 124, as well as cyan, magenta and yellow solids 123 are printed. This group of eight areas 110, 113, 124, 123 (first three-color halftone, second three-color halftone, second cyan, magenta and yellow, and solid cyan, magenta and yellow) should be printed under a variety of press conditions in order to generate variations in dot gain that are representative of the variations that will be encountered under normal operation. For each printed image of these eight areas, 110, 113, 123, 124 the two control areas 110, 113 should be measured with densitometer 112 for blue, green and red densities. The densities are converted in computer 115 separately for the blue, green and red channels. Then the dot gain of the second halftones should be found by measuring the second halftones and solids with densitometer 125 and using the Yule-Nielsen equation. Calibration then involves the plotting of a calibration curve of the expression in equation (16) as a function of dot gain, separately for the blue, green and red ratios. These curves are then used in the solution of step #2, whereby the expression derived from measurement of the first and second halftones would correspond to a unique value of dot gain.

The invention disclosed and claimed herein is not limited to the specific procedures and the techniques herein shown and described, since modifications will undoubtedly occur to those skilled in the art. Hence, departures may be made from the method without departing from the principles thereof.

What is claimed is:

1. A method of monitoring image quality in a multicolor printing process, comprising the steps of:
    printing two different three-color halftone control areas, each of the control areas consisting of overprinted cyan, magenta, and yellow halftones;
    measuring, with a densitometer the red, green and blue optical densities of both control areas;
    calculating the densities of the halftones of cyan, magenta and yellow ink from the red, green and blue densities of the first control area;
    calculating the densities of the halftones of cyan, magenta and yellow ink from the red, green and blue densities of the second control area;
    calculating the solid densities and dot gains of the cyan, magenta and yellow images from the densities of the first and second halftones of cyan, magenta and yellow, respectively; and
    monitoring image quality in the printing process based upon the solid densities and dot gains of the cyan, magenta and yellow images.

2. Method, as in claim 1, where the two different three-color halftone control areas are both control targets.

3. Method, as in claim 2, wherein said control targets consist of one light and one dark near-neutral control targets.

4. Method, as in claim 1, where the two different three-color halftone control areas are within the final multi-color printed image.

5. Method, as in claim 3, where the dark near neutral target comprises balanced cyan, magenta and yellow halftones, none of which exceed a relative dot area of 75%.

6. Method, as in claim 3, where the light near neutral target comprises balanced cyan, magenta and yellow halftone with relative dot areas between 10% and 40% and the dark near neutral target comprises balanced cyan, magenta and yellow halftones with relative dot areas between 40% and 75%.

7. Method, as in claim 2, where the two three-color halftone control targets are the only control targets printed.

8. Method, as in claim 3, where the light and dark near-neutral targets are the only control targets printed.

9. Method, as in claims 1, 2, 3, or 4, where the densitometer is mounted on the printing press.

10. Method, as in claims 1, 2, 3 or 4, where the printing press operates according to the offset lithographic technique.

11. Method, as in claims 1, 2, 3 or 4 where the densitometer optical filters have bandwidths that do not exceed 30 nm.

12. A method of controlling image quality in a multi-color printing process, comprising the steps of:
   printing two different three-color halftone control areas, each of the control areas consisting of overprinted cyan, magenta and yellow halftones;
   measuring, with a densitometer, the red, green and blue optical densities of each control area;
   calculating the densities of the halftones of cyan, magenta and yellow ink from the red, green and blue densities of the first control area;
   calculating the densities of the halftones of cyan, magenta and yellow ink from the red, green and blue densities of the second control area;
   calculating the solid densities and dot gains of the cyan, magenta and yellow images from the halftone densities of the first and second halftones of the cyan, magenta and yellow, respectively;
   controlling image quality by adjusting the multi-color printing process based upon the solid densities and dot gains of the cyan, magenta and yellow images to improve the quality of the multi-color image.

13. Method, as in claims 1, 2, 3, 4, or 12 where the dot gains and solid densities for each process color are calculated according to $$\delta = \frac{a_2(1 - R_1^{1/n}) - a_1(1 - R_2^{1/n})}{2\sqrt{a_2(1-a_2)} \times (1 - R_1^{1/n}) - 2\sqrt{a_1 - (1-a_1)} \times (1 - R_2^{1/n})}$$

and $$R_s = \left\{ 1 - \frac{1 - R_1^{1/n}}{a_1 + 2\delta\sqrt{a_1(1-a_1)}} \right\}^n$$

respectively, where the subscripts "1" and "2" refer to the first and second halftones, respectively, for each process color, and where
β = dot gain for 50% dot area
R = process color halftone reflectance
n = Yule-Nielsen factor, and
$R_s$ = solid reflectance.

14. Method, as in claims 1, 2, 3, 4 or 12 where the dot gains are calculated by
(i) evaluating, for each process color, the expression $$\frac{1 - R_1^{1/n}}{1 - R_2^{1/n}}$$

where the subscripts "1" and "2" refer to the first and second halftones, respectively, for each process color and where R = process color halftone reflectance and n = Yule Nielson factor, and,
(ii) finding the values of dot gain corresponding to said evaluation via a calibration curve.

15. The method according to claims 1 or 12 wherein the calculation of the halftone densities of the halftones of cyan, magenta and yellow ink from the measured red, green and blue densities of the first and second control areas are calculated by solving the simultaneous equations:

$$D_b(N) = a_{11}D(C) + a_{12}D(M) + a_{13}D(Y)$$

$$D_g(N) = a_{21}D(C) + a_{22}D(M) + a_{23}D(Y)$$

$$D_r(N) = a_{31}D(C) + a_{32}D(M) + a_{33}D(Y)$$

where,
$D_b(N)$ = measured blue density of overprint
$D_g(N)$ = measured green density of overprint
$D_r(N)$ = measured red density of overprint
$D(C)$ = cyan halftone density
$D(M)$ = magenta halftone density
$D(Y)$ = yellow halftone density
$a_{11} = D_b(C)/D_r(C)$
$a_{12} = D_b(M)/D_g(M)$
$a_{13} = 1$
$a_{21} = D_g(C)/D_r(C)$
$a_{22} = 1$
$a_{23} = D_g(Y)/D_b(Y)$
$a_{31} = 1$
$a_{32} = D_r(M)/D_g(M)$
$a_{33} = D_r(Y)/D_b(Y)$
$D_b(C)$ = blue density of cyan halftone
$D_g(C)$ = green density of cyan halftone
$D_r(C)$ = red density of cyan halftone
$D_b(M)$ = blue density of magenta halftone
$D_g(M)$ = green density of magenta halftone
$D_r(M)$ = red density of magenta halftone
$D_b(Y)$ = blue density of yellow halftone
$D_g(Y)$ = green density of yellow halftone
$D_r(Y)$ = red density of yellow halftone 16. The method according to claim 15 further comprising:
   determining the matrix coefficients $a_{11}$, $a_{12}$, $a_{21}$, $a_{23}$, $a_{32}$ and $a_{33}$ for each of the first and second control areas by;
   separately printing single color cyan, magenta and yellow halftones,
   measuring, with the densitometer, $D_b(C)$, $D_g(C)$, $D_r(C)$, $D_b(M)$, $D_g(M)$, $D_r(M)$, $D_b(Y)$, $D_g(Y)$, and $D_r(Y)$.

17. In single-color printing, a method of calculating dot gain from measurements of the densities of a first and second halftone comprising the steps of:
   evaluating the expression in the equation $$\frac{(1 - R_L^{1/n})}{(1 - R_D^{1/n})}$$

where $R_L$ is the reflectance of the lighter halftone, $R_D$ is the reflectance of the darker halftone, and n is the Yule-Nielsen factor,
and,
finding the value of dot gain corresponding to said evaluation on a calibration curve.

18. A system for monitoring image quality in a multi-color printing process comprising:
   printing means for printing two different first and second three-color halftone control areas, the control areas each consisting of overprinted cyan, magenta and yellow halftone images;
   densitometer means for measuring the red, green and blue densities of both control areas;

first calculating means for calculating the densities of the halftone images of cyan, magenta and yellow ink from the red, green and blue densities of the first control area;

second calculating means for calculating the densities of the halftone images of cyan, magenta and yellow ink from the red, green and blue densities of the second control area;

third calculating means for calculating the solid densities and dot gains of the cyan, magenta and yellow images from the halftone densities of the first and second halftone images of cyan, magenta and yellow; and means for displaying the solid densities and dot gains of the cyan, magenta and yellow images.

* * * * *

UNITED STATES PATENT AND TRADEMARK OFFICE
CERTIFICATE OF CORRECTION

PATENT NO. : 4,706,206
DATED : November 10, 1987
INVENTOR(S) : Benoit, et al

It is certified that error appears in the above-identified patent and that said Letters Patent is hereby corrected as shown below:

Column 3, line 22, "faces" should read -- faced --.

Column 11, line 48, "$\beta$" should be $\delta$ as shown at column 11, line 33.

Signed and Sealed this

Tenth Day of May, 1988

*Attest:*

DONALD J. QUIGG

*Attesting Officer*  *Commissioner of Patents and Trademarks*